United States Patent [19]

Kamin

[11] 4,163,251
[45] Jul. 31, 1979

[54] APPARATUS FOR THE AMPLITUDE DISCRIMINATION OF A VIDEO SIGNAL

[75] Inventor: Gerhard R. Kamin, Traisa, Fed. Rep. of Germany

[73] Assignee: Robert Bosch GmbH, Stuttgart, Fed. Rep. of Germany

[21] Appl. No.: 887,835

[22] Filed: Mar. 17, 1978

[30] Foreign Application Priority Data

Mar. 17, 1977 [DE] Fed. Rep. of Germany ....... 2711611

[51] Int. Cl.² .................. H04N 7/18; H04N 5/14
[52] U.S. Cl. .................................. 358/107; 358/160
[58] Field of Search ............... 358/160, 166, 284, 111, 358/135, 93, 106, 107; 364/515; 340/347 AD; 356/157–158; 328/115, 150, 111; 307/350, 360, 361; 325/38 A

[56] References Cited

U.S. PATENT DOCUMENTS

| | | | |
|---|---|---|---|
| 3,674,926 | 7/1972 | Dewey et al. | 358/160 |
| 3,809,926 | 5/1974 | Young | 307/360 |
| 3,963,983 | 6/1976 | Hogg | 307/360 |
| 3,991,376 | 11/1976 | Stevens | 328/115 |
| 4,030,119 | 6/1977 | Ellis | 358/160 |
| 4,125,858 | 11/1978 | Hounsfield et al. | 358/111 |

*Primary Examiner*—John C. Martin
*Assistant Examiner*—Alexander Gerasimow
*Attorney, Agent, or Firm*—Littlepage, Quaintance, Murphy, Richardson and Webner

[57] ABSTRACT

The invention concerns an apparatus for the amplitude discrimination of a video signal of the kind wherein the video signal is applied to a window discriminator which is adapted to provide a binary signal during periods when the amplitude of the video signal lies in a predetermined sub-range of the total amplitude range of the video signal.

In order to avoid the presence in the binary signal of transient pulses which result from the slow rise time of the video signal when the latter effects a transition across an edge between an area of picture with the video signal amplitude below the said sub-range and an area of picture with a video signal amplitude above the sub-range, second and third binary signals are produced when the amplitude of the video signal lies above and below the sub-range respectively. The three binary signals are analysed in two dimensions so as to detect the presence of edges in the picture represented by the video signal, and when such an edge is detected the first mentioned binary signal is suppressed so that the undesired transient pulses do not occur.

9 Claims, 10 Drawing Figures

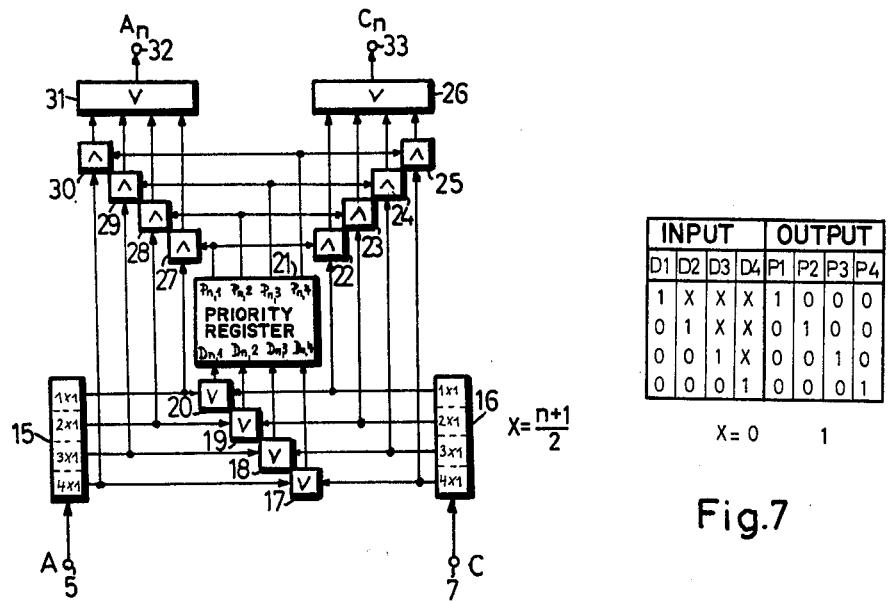
Fig.6
Fig.7
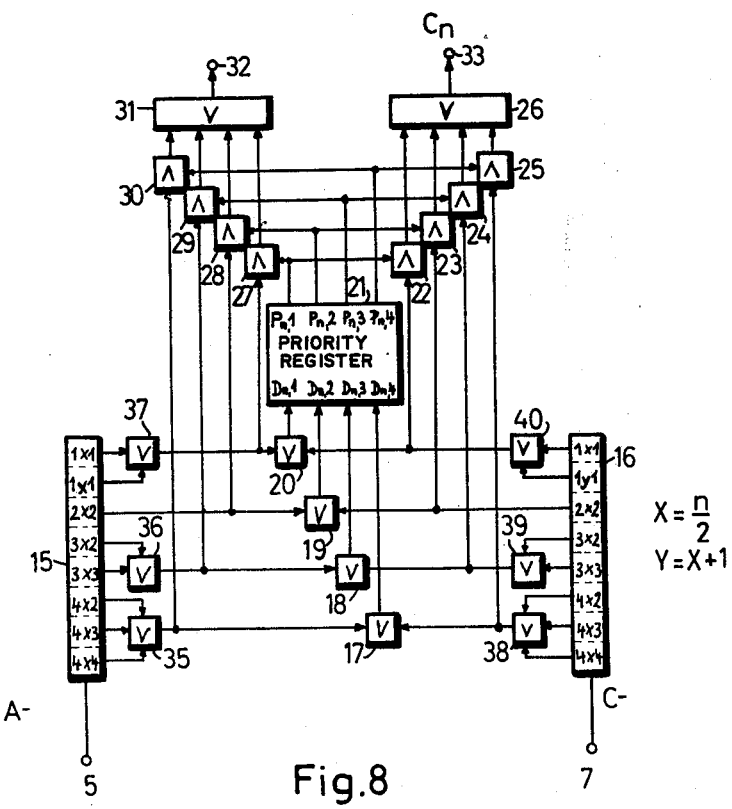
Fig.8

APPARATUS FOR THE AMPLITUDE DISCRIMINATION OF A VIDEO SIGNAL

FIELD OF THE INVENTION

This invention relates to an apparatus for the amplitude discrimination of a video signal of the kind in which the video signal is applied to a window discriminator which is adapted to provide a binary signal during periods when the amplitude of the video signal lies in a predetermined sub-range of the total amplitude range of the video signal.

PRIOR ART

Such an apparatus is disclosed, for example, in German OS No. 20 64 729. However, in the automatic quantitative picture analysis of video signals, this technique (see for example the periodical "Radio Mentor" No. 3, 1969, page 156 and 157, in particular page 157, FIG. 4) leads to faulty measurement results. The reason for this may be seen with reference to the voltage time diagrams of FIG. 1. FIG. 1a shows one horizontal period of a video signal to be analysed. The amplitude range of the picture signal in this horizontal period is limited by the black value 0% and the white value 100%. The total amplitude range between the white and the black values is subdivided into the amplitude sub-ranges A, B and C (separated by dashed lines). The amplitude sub-ranges A, B and C correspond to three different grey ranges. Let is be assumed that the video signal components lying in the amplitude sub-range B are to be discriminated. A window discriminator which operates according to known principles thus delivers a binary signal according to FIG. 1b. The width of the pulses in the intervals $\tau_1$, $\tau_2$ and $\tau_3$ corresponds to the length of time for which the amplitude of the video signal lies in the amplitude sub-range B. It will be seen that not only are portions of the video signal corresponding to relatively large picture areas in the medium grey range B discriminated as desired (interval $\tau_1$), but also due to the finite rise time of the video signal transient signals passing through this range ($\tau_2$ and $\tau_3$) and representing an edge between an area in the dark grey range C and an area in the light grey range A are also detected. Those pulses ($\tau_2$ and $\tau_3$) in the binary signal which are attributed to the signal edges correspond in a reproduced picture to so-called "halos" outlining the brighter picture details. In quantitative picture analysis such "halos" prove to be disturbing because they lead to spurious measurement results.

SUMMARY OF THE INVENTION

According to the present invention there is provided in an apparatus for the amplitude discrimination of a video signal of the kind in which the video signal is applied to a window discriminator which is adapted to deliver a first binary signal during periods when the amplitude of the video signal lies in a predetermined sub-range of the total amplitude range of the video signal, the improvement comprising means for producing a second binary signal during periods when the amplitude of the video signal lies below the said amplitude sub-range and a third binary signal when the amplitude of the video signal lies above the said amplitude sub-range, means for storing the binary signals, means for analysing the stored signals two-dimensionally in accordance with a predetermined criterion to determine whether the first binary signal at any instant corresponds to an edge transition between a picture area whose video signal amplitude lies above the said sub-range and a picture area whose video signal amplitude lies below the said sub-range, and means for suppressing the first binary signal when such criterion is fulfilled.

The invention has the advantage that the pulses in the first binary signal which arise from transient edge signals are suppressed, resulting in the avoidance of "halo" rings.

The two-dimensional analysis can be effected with particular advantage in respect of video signals corresponding to an hexagonal dot raster pattern. Each picture element detected by the window discriminator as belonging to the amplitude sub-range B is analysed, for the purpose of determining whether it is to be suppressed, in its relationship to a plurality of picture elements which surround it and which lie on or immediately adjacent predetermined axes in the hexagonal raster pattern. For this purpose the axes are arranged in the manner of a star centred on the picture element under analysis.

BRIEF DESCRIPTION OF THE DRAWINGS

FIG. 6 is a block schematic diagram of a circuit for analysing one half of a main axis, FIG. 7 is a truth table of the priority register in the circuit of FIG. 6, FIG. 8 is a block schematic diagram of a circuit for analysing one half of a secondary axis.

In the figures of the drawings those components having an equivalent function are indicated by the same reference characters.

DESCRIPTION OF THE PREFERRED EMBODIMENT

Figure 1:
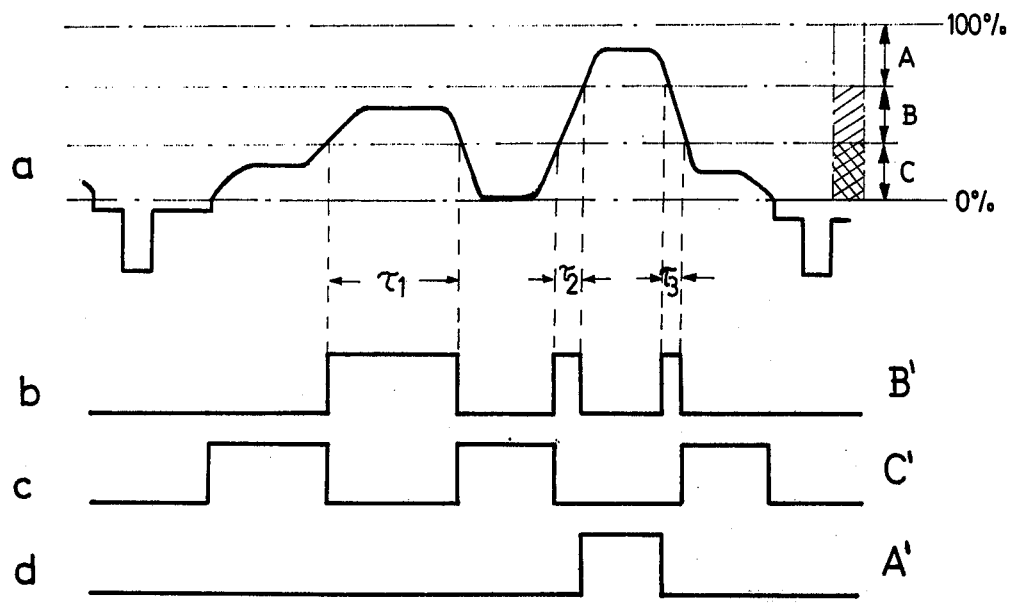
FIG. 1 shows voltage-time diagrams for explaining the operation of an embodiment of the invention.

As already mentioned FIG. 1a shows one horizontal period of a video signal, derived by line scanning, which is to be discriminated on the basis of amplitude. If this video signal is delivered to a known type of window discriminator, the binary signal B' shown in FIG. 1b is obtained for the amplitude sub-range B, the binary signal C' shown in FIG. 1c is obtained for the amplitude sub-range C, and the binary signal A' shown in FIG. 1d is obtained for the amplitude sub-range A. Furthermore, as already mentioned, in the quantitative picture analysis of the video signals those pulses occurring in the intervals $\tau_2$ and $\tau_3$ of the binary signal of FIG. 1b, which can be attributed to the presence of transitions in the video signal corresponding to edges, represent disturbances in the picture analysis because these edges are properly to be regarded as belonging to the sub-range A but only occur in the sub-range B as a result of the finite rise time of the video signal. These transient pulses should not, therefore, be used for the analysis of the picture.

Figure 2:
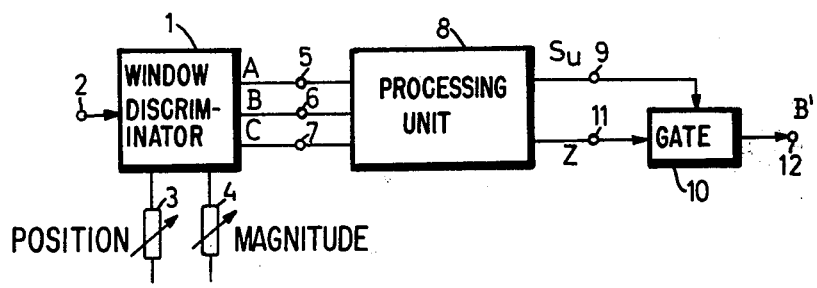
FIG. 2 is a simplified block schematic diagram of the embodiment of the invention.

By means of the circuit arrangement of FIG. 2 the pulses occurring during the intervals $\tau_2$ and $\tau_3$ can be suppressed. In this block schematic diagram the video signal which is to be analysed is supplied at a terminal 2 and is applied to a window discriminator 1. By means of the adjusting elements 3 and 4 it is possible to adjust the position and the magnitude of the amplitude sub-range B within the total amplitude range of the video signal, that is to say the upper and lower thresholds of the amplitude sub-range B can be varied. At the outputs 5, 6 and 7 of the window discriminator 1 there are available binary signals corresponding to the periods of time for which the video signal lies in the amplitude sub-ranges A, B and C respectively. The three binary signals are delivered to a processing unit 8 (to be described in greater detail later) which performs a two-dimensional analysis according to predetermined criteria to determine the presence or the absence of an edge transition in the video signal when the latter lies in the amplitude sub-range B. In the event that such an edge transition is detected in the video signal, a suppression signal $S_U$ appears at a terminal 9, which signal controls a gate circuit 10 which for the duration of $S_U$ is switched into the non-conducting condition, the gate circuit 10 otherwise being in a conducting condition. The signal input of the gate circuit 10 is connected through a terminal 11 to the output of the processing unit 8. Thus, if there is applied to the input terminal 2 of the window discriminator 1 a video signal having the voltage curve shown in FIG. 1a, at the output terminal 12 of the gate circuit 10 there is available a binary signal B' wherein the pulses occurring in the intervals $\tau_2$ and $\tau_3$ of the binary signal B of FIG. 1b are suppressed.

In German AS No. 22 29 901 there is disclosed a line raster in which each line is resolved into a succession of dots or picture elements. The successive fields of the video signal are mutually interposed according to the line interlace technique. The spacing from one raster dot to the next raster dot in a line is defined as one raster dot period. The raster dots of adjacent lines are staggered by one half of a raster dot period. In this way an hexagonal dot raster pattern is obtained. This is the form of raster preferably used in performing the present invention. The resolution of the lines into individual dots or picture elements may be performed at any convenient point, either in respect of the video signal itself prior to application to the discriminator 1 or in respect of the binary signals prior to processing in the unit 8. This resolution into individual elements may be accomplished by known scanning or sampling techniques.

Figure 3:
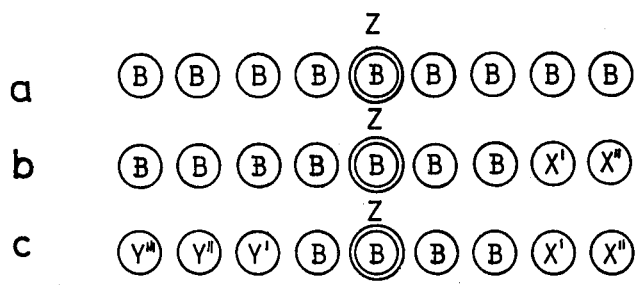
FIG. 3 shows various combinations of picture elements upon a horizontal axis.

FIG. 3 shows three different line segments of the dot raster of the video signal. FIG. 3a shows a line segment with nine picture elements which have been detected by the window discriminator 1 as lying in the amplitude sub-range B. Such picture elements are referred to in the following description as B elements. In contrast thereto, A elements are referred to when the picture elements have been detected by the window discriminator 1 as lying in the amplitude sub-range A, and C elements are referred to when the picture elements have been detected by the window discriminator 1 as lying in the amplitude sub-range C.

By means of a two-dimensional analysis the processing unit 8 investigates each picture element in turn to determine whether such element is located at an edge of the video signal within the amplitude sub-range B. In the following, the particular element under investigation at any particular time will be referred to as the central element Z. Because we are only interested finally in the B elements, only those element combinations will be considered in which the central element Z is a B element (Z=B). In the present embodiment a disturbing edge in the video signal is assumed to be present when, within any range of nine elements such as are shown in FIG. 3, a central B element, or a series of adjacent B elements including the central B element, is bounded by a C element at one side and by an A element at the other side.

Under this condition, the central element Z in FIG. 3a is recognised as a B element with reference to the horizontal axis orientated with the line direction because all elements adjacent to the central element Z on either side thereof are B elements. Consequently the central element Z of FIG. 3a is, so far as the horizontal axis is concerned, not situated at an edge of the video signal. In FIG. 3b the picture elements indicated a X' and X'' may be A elements or C elements. However, the central element Z is still recognised as a B element with reference to the axis considered in the line direction because all the adjacent elements, on at least one side, are B elements. Therefore the classification (A or C) of the picture elements indicated at X' and X'' is irrelevant for the central element concerned. In the sequence of picture elements shown in FIG. 3c, elements which differ from B are positioned to the left and right of the central element Z. If Y'=X', that is to say if the picture elements indicated by X' and Y' are both A elements or C elements, then this confirms that the central element Z is a B element with reference to the axis under consideration. If on the other hand Y'≠X' then the central element Z evidently belongs to a segment of the video signal which proceeds from the amplitude sub-region A temporarily through the amplitude sub-region B into the amplitude sub-region C or vice versa, and must therefore be interpreted as an "edge element" to be suppressed. The classification of the picture elements indicated by Y'', Y''' and X'' are not taken into consideration because they are not relevant to the picture area under analysis to which the central element Z belongs.

In making the analysis it is generally necessary to take into account elements in both directions outwardly from the central element Z and to include all of the B elements occurring in unbroken sequence and, possibly, the first element which is not a B element.

Figure 5:
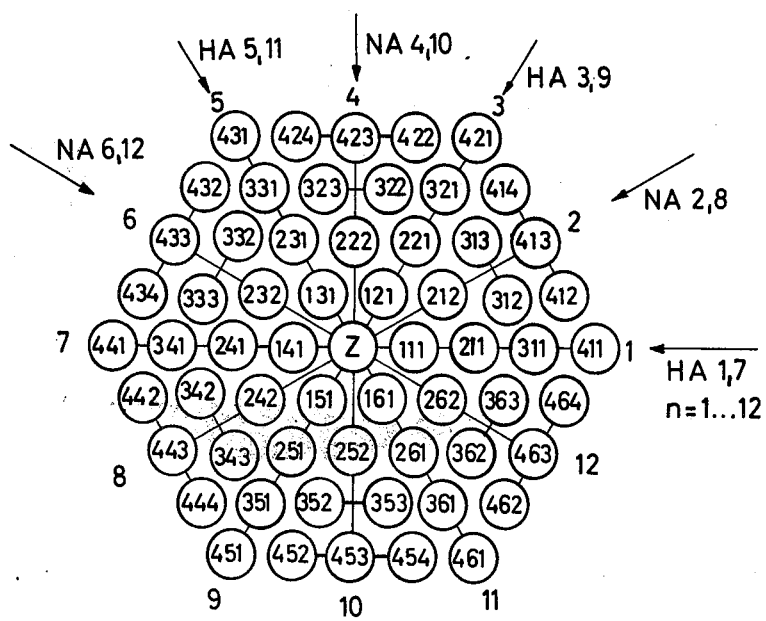
FIG. 5 shows the preferred arrangement of axes relative to the picture elements in an hexagonal raster pattern.

The above described analysis, which is only unidimensional must be performed along a plurality of axes around the central element Z because of the two-dimensional character of a television picture. Accordingly, sets of adjacently situated elements are analysed along axes in other directions. In the present practical example using a dot raster of hexagonal pattern for the video signal, six axes are used which intersect at the central element Z and form a star-shaped analysing field as shown in FIG. 5. In FIG. 5 the six axes are identified by opposite pairs of half axes numbered 1 to 12. In this star-shaped analysing field a distinction is drawn between main axes HA and secondary axes NA. In contrast to the main axes HA, upon each of which there lies a single row of nine actual picture elements, more complex configurations of elements occur along the secondary axes NA. Thus, for example, in the analysis, the picture elements 111 and 121 of the adjacent main axes HA 1,7 and HA 3,9 are regarded as a virtual element upon the secondary axis NA 2,8 in a position between the central element Z and the picture element 212, and likewise the picture elements 312 and 313 are regarded as lying between the picture elements 212 and 413 upon the secondary axis NA 2,8, whilst the picture elements 412 and 414 are regarded as congruent with the picture element 413. Thus nine elements effectively lie along each secondary axis NA. The individual class arrangement (A, B or C) remains unaffected in this method of spatially grouping the elements.

Figure 4:
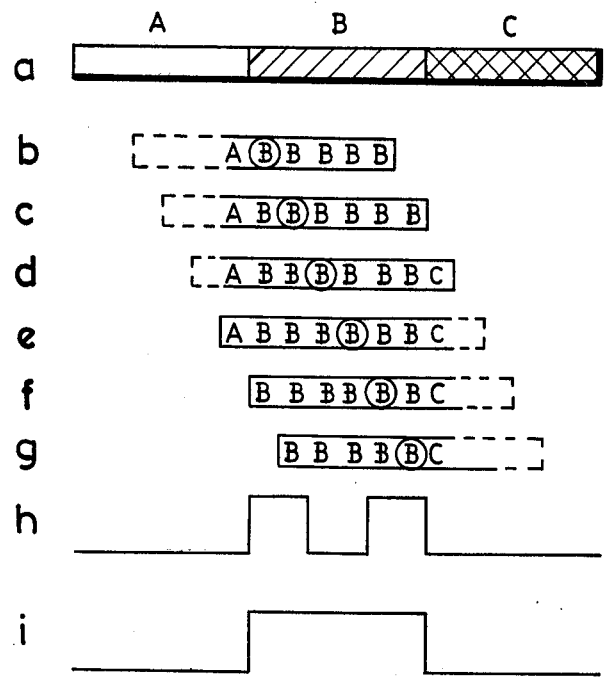
FIG. 4 is a diagram for explaining the need for a preferred condition in the analysis of picture elements by the embodiment of FIG. 2.

On the assumption that an analysis is carried out in the line direction with such a type of star pattern, then without imposing any additional condition, undesired interruptions arising from the nature of the system will occur in the binary signal B with certain sequences of picture elements. The diagrams of FIG. 4 will make this clear. In the line a of FIG. 4 there is represented a line segment which contains different grey regions A, B and C. This line segment is analysed, for example, in the direction of the main axis HA 1,7. The central elements (circled) of the lines b and c of FIG. 4 are recognised as B elements, because no transition from A towards C, or vice versa, can be detected within the nine elements under consideration. However, in the lines d and e of FIG. 4 the central element Z, detected by the window discriminator as a B element, is suppressed as it is embraced within the nine elements by an A to C transition. In the line f of FIG. 4, the A element falls outside the detection range of the star pattern, and the central element Z is thus recognised as a B element. In a similar manner the central element Z in the line g of FIG. 4 is also recognised. Accordingly for a line segment corresponding to FIG. 4a a binary signal according to FIG. 4h is obtained.

The interruption in the binary signal of FIG. 4h is attributable to the finite dimensions of the star pattern field analysis. The star pattern of the field analysis can completely suppress only video signal rises having greater than a minimum gradient along any axis—this minimum gradient in the present embodiment corresponding to a transition from an A element to a C element (or vice versa) within five picture elements. Accordingly, it is advantageous in order to avoid partial suppression of more gradual transitions for an additional condition to be provided in that suppression of B elements can only take place if the intervening space between a transition from an A element to a C element or vice versa is occupied by not more than four B elements. Accordingly, the binary signal shown in FIG. 4i is obtained.

In FIG. 6 there is shown a detector for A and C elements of which a respective detector is used for each half of each main axis HA. In FIG. 6, as in FIGS. 8 and 9, the letter n represents the half axis number of the detector concerned. The binary signal available at the output terminal 5 of the window discriminator 1 is fed in serial mode into a shift register 15, and the binary signal available at the terminal 7 is fed serially into a shift register 16, the signals being available in parallel mode for an evaluation of the central element. In FIG. 6 only the shift register stages containing the picture elements required for analysis in respect of the particular half axis concerned are shown. The signals available in parallel at the shift registers 15 and 16 are OR coupled in OR gates 17, 18, 19 and 20 and delivered to the inputs D1 to D4 of a priority register 21. The signals available at the outputs P1 to P4 of the priority register 21 are AND coupled in AND gates 22, 23, 24 and 25 to the signals available at the output of the shift register 16 and delivered to the inputs of an OR gate 26. In a corresponding manner the signals available at the outputs of the priority register 21 are logically AND coupled in AND gates 27, 28, 29 and 30 to the signals available at the outputs of the shift register 15, and are delivered to the inputs of another OR gate 31. The truth table of the priority register 21 is shown in FIG. 7. A known priority register of the integrated circuit technique bears the type reference NS 74278 N.

The logical linkage in the block schematic diagram of FIG. 6 results in a binary H signal at the output terminal 32 of the OR gate 31 if—as seen from the central element Z—the first $\overline{B}$ picture element interrupting a series of B elements is an A picture element ($\overline{B}$ picture element=a non-B element). On the other hand, at the output terminal 33 of the OR gate 26 an H signal is available if the $\overline{B}$ picture element is a C element.

The block schematic diagram shown in FIG. 8 of a detector for one half of a secondary axis NA differs from the block schematic diagram shown in FIG. 6 only in respect of the logical coupling of the A and C elements from the shift registers 15 and 16, which coupling is designed to provide the four (actual or virtual) elements described with reference to FIG. 5. FIG. 8 accomplishes this logical coupling by means of OR gates 35 to 40 at the outputs of the shift registers 15 and 16. With one exception, each element at 17 to 20 is derived from two or three picture elements, so that there is the possibility of the simultaneous appearance of an A element and a C element at one and the same data input of the priority register 21. In this case both the $A_n$ output (terminal 32) as well as the $C_n$ output (terminal 33) will deliver an H signal.

Figure 9:
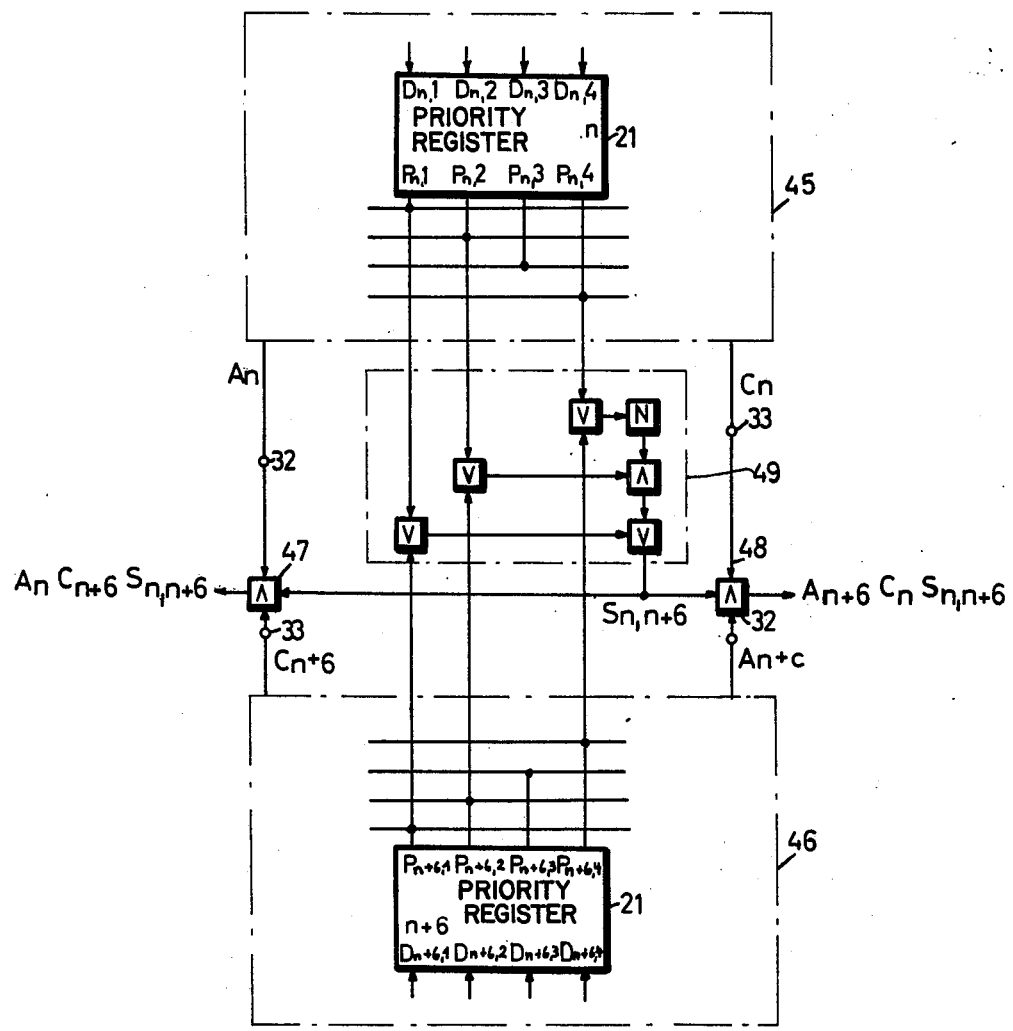
FIG. 9 is a block schematic diagram showing how the circuits of two halves of an axis are combined to form an analysing circuit for a complete axis.

The half axis detectors described above are assembled together in pairs (1+7, 2+8, 3+9, 4+10, 5+11, 6+12) for deriving the A to C transition information in respect of each complete axis. FIG. 9 shows the resulting block schematic diagram for each complete axis. Within each of the blocks 45 and 46 shown in the dash and dot lines there is contained a circuit arrangement as shown in FIG. 6 or FIG. 8. The signal available at the terminal 32 of the block 45 is logically AND coupled in an AND gate 47 with the signal available at the terminal 33 of the block 46. In a similar manner the respective signals available at the terminal 33 of the block 45 and at the terminal 32 of the block 46 are subjected to a logical AND coupling in another AND gate 48. A detected A to C transition only comes into effect for suppression purposes if the aforementioned additional condition is satisfied, i.e., the suppression of a central B element in the presence of at least one A to C transition on one of the possible axes of the star is only permissible if between the A and the C element including the Z element not more than four B elements occur in an unbroken sequence.

A signal $S_{n,\,n+6}$ representing this additional condition per axis assumes the logical value H upon satisfaction of that condition. The logical network for this additional condition is represented by the block 49 enclosed in the dashed and dotted lines. The signal $S_{n,\,n+6}$ is derived from the signal configurations at the outputs of each of the two priority registers 21 belonging to the axis concerned, in accordance with the following equation:

$$S_{n,n+6} = P_{n,1} + P_{n+6,1} + (P_{n+2} + P_{n+6,2})$$
$$(P_{n,4} + P_{n+6,4})$$

Figure 10:
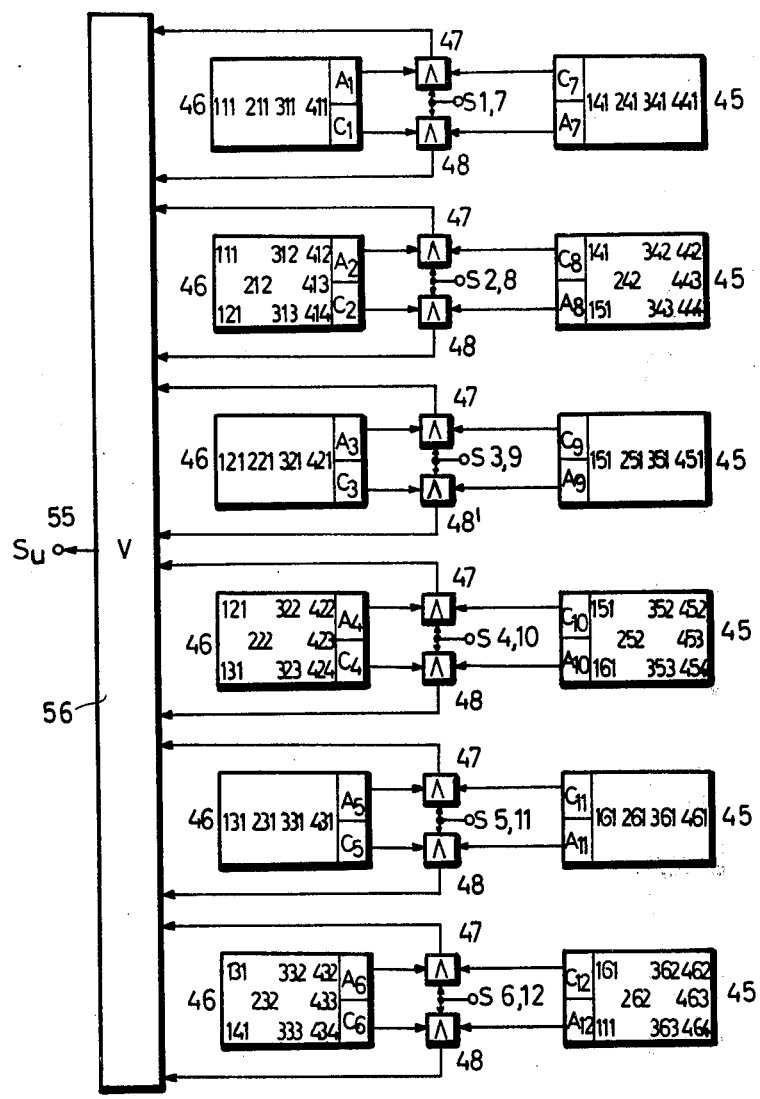
FIG. 10 is a block schematic diagram showing how the analysing circuits for all the axes are combined to form the processing unit 8 of FIG. 2.

FIG. 10 shows the assembly of all the block schematic diagrams for the various axes of the star pattern for the complete field analysis. All of the ($A_n C_{n+6}$ and $A_{n+6} C_n$) combinations, which are logically AND coupled with $S_{n,n+6}$ are, for the purpose of producing a final suppression signal $S_u$ at the terminal 55, OR linked with an OR gate 56. The suppression signal $S_u$ then satisfies the condition which can be expressed formally as:

$$S_u = \sum_{n=1}^{6} S_{n,n+6} (A_n C_{n+6} + A_{n+6} C_n)$$

If the suppression signal $S_u$ assumes the logic value H, then the central B element under analysis (Z=B) is suppressed.

Instead of using the hexagonal pattern dot raster as in the presently described practical example, it is also possible to use other dot rasters, for example orthogonal rasters. The corresponding changes in the directions of the axes will then require correspondingly adapted logical coupling networks.

I claim:

1. In an apparatus for the amplitude discrimination of a video signal of the kind in which the video signal is applied to a window discriminator which is adapted to deliver a first binary signal during periods when the amplitude of the video signal lies in a predetermined sub-range of the total amplitude range of the video signal, the improvement comprising means for producing a second binary signal during periods when the amplitude of the video signal lies below the said amplitude sub-range and a third binary signal when the amplitude of the video signal lies above the said amplitude sub-range, means for storing the binary signals, means for analysing the stored signals two-dimensionally in accordance with a predetermined criterion to determine whether the first binary signal at any instant corresponds to an edge transition between a picture area whose video signal amplitude lies above the said sub-range and a picture area whose video signal amplitude lies below the said sub-range, and means for suppressing the first binary signal when such criterion is fulfilled.

2. An apparatus according to claim 1, wherein the analysis of the binary signals is performed in respect of individual picture elements, and wherein the analysing means includes means for examining, in turn in respect of each picture element (referred to hereinafter as a central element) giving rise to a first binary signal at the window discriminator, the binary signals corresponding to a predetermined field of picture elements surrounding the central element in order to detect the presence of a relationship between the elements of the field indicative of the presence of an edge transition at the central element, whereby when such a relationship is detected the first binary signal corresponding to the central element is suppressed.

3. An apparatus according to claim 2, wherein the analysing means includes means for examining, independently in respect of each of a plurality of axes which intersect at the central element, the binary signals of a predetermined set of picture elements lying on or alongside the axis on either side of the central element, whereby when a predetermined relationship is detected between the set of picture elements of at least one axis the first binary signal of the central element is suppressed.

4. An apparatus according to claim 3, wherein the predetermined relationship includes the condition that a pair of elements of the set on opposite sides of the central element give rise to second and third binary signals respectively with all the intervening elements of the set giving rise to first binary signals.

5. An apparatus according to claim 4, wherein the predetermined relationship further includes the condition that the said pair of elements on opposite sides of the central element are spaced apart along the axis by no more than a predetermined amount.

6. An apparatus according to claim 5, wherein the picture elements correspond to a dot raster pattern of which the dots of each line are displaced by half a dot period from the dots of the immediately adjacent lines so as to form a hexagonal pattern, and wherein the axes are six in number arranged in the form of a star.

7. An apparatus according to claim 6, wherein the analysing means comprises a respective circuit for examining the picture elements of each half of each axis, in which circuit the second binary signal is delivered serially to a first shift register and the third binary signal is delivered serially to a second shift register, the signals available in parallel mode at the outputs of the two shift registers are logically OR coupled and delivered to the inputs of a priority register, the signals available in parallel mode at the outputs of the two shift registers are also logically AND coupled to the output signals of the priority register, and the logically AND coupled signals are delivered to first and second OR gates.

8. An apparatus according to claim 7, in which the circuits are connected in pairs in respect of each axis in such manner that the output signals of the first and second OR gates of each pair are logically coupled in two AND gates.

9. An apparatus according to claim 8, in which there is also delivered to each of the two AND gates a signal derived in a logic network from the signals at the outputs of the priority registers of the connected pair of circuits.

* * * * *